United States Patent [19]
Krupica et al.

[11] Patent Number: 5,785,312
[45] Date of Patent: Jul. 28, 1998

[54] DUAL MEDIA BUFFER WITH OVER-RUNNING CLUTCH SYSTEM

[75] Inventors: Libor Krupica, Methuen; Peter Austin, Wilmington; Edward L. Kelley, Tewksbury, all of Mass.

[73] Assignee: Bayer-AGFA, Wilmington, Mass.

[21] Appl. No.: 569,378

[22] Filed: Dec. 8, 1995

Related U.S. Application Data

[63] Continuation of Ser. No. 180,411, Jan. 12, 1994, abandoned.

[51] Int. Cl.⁶ ........................................ B65H 5/00
[52] U.S. Cl. ........................... 271/264; 226/189; 242/101
[58] Field of Search .................... 271/270, 272, 271/273, 202, 225, 264, 65, 306, 184, 185, 186; 226/189; 242/101, 535.2, 535, 535.1

[56] References Cited

U.S. PATENT DOCUMENTS

| | | | |
|---|---|---|---|
| 4,513,959 | 4/1985 | Kindt | 271/270 |
| 4,956,678 | 9/1990 | Kiya et al. | 271/186 X |

FOREIGN PATENT DOCUMENTS

| | | |
|---|---|---|
| 0 352 374 | 1/1990 | European Pat. Off. |
| 0 429 884 | 11/1990 | European Pat. Off. |
| 0 474 162 | 9/1991 | European Pat. Off. |
| 0207343 | 11/1984 | Japan ........................ 271/264 |
| 0111359 | 5/1991 | Japan ........................ 271/272 |
| 4135569 | 11/1992 | Japan ........................ 271/306 |
| 2 100 882 | 1/1983 | United Kingdom. |

OTHER PUBLICATIONS

European Search Report for Application EP 94 12 0416, (three pages).

*Primary Examiner*—William E. Terrell
*Assistant Examiner*—T. Kelly
*Attorney, Agent, or Firm*—Julie A. Krolikowski

[57] ABSTRACT

A dual buffer internal to an imaging device uses a one-way, over-running clutch system to buffer multiple sheets of media between an internal drum recorder and a processor. The one-way over-running clutch system is incorporated into a drive system of a plurality of rollers that transport the media. An input set of rollers and an output set of rollers are driven independently to allow for two sheets of media to be buffered simultaneously and at different speeds if desired. The buffer is mounted pivotally within the imaging device to allow access into the imaging device and to allow installation of a take-up cassette as an alternative to the buffer.

20 Claims, 10 Drawing Sheets

DUAL MEDIA BUFFER WITH OVER-RUNNING CLUTCH SYSTEM

This is a continuation of application Ser. No. 08/180,411, filed Jan. 12, 1994, now abandoned.

BACKGROUND OF THE INVENTION

This invention relates to transporting web-type material from a first machine operating at a first speed to a second machine operating at a second speed and provides an apparatus to allow each machine to operate at its own speed while minimizing idle time. An example is automated photographic imaging and subsequent developing of web-type material. These consecutive processes usually occur at different operating speeds, and comprise forming of a photographic latent image in an imaging device by illumination exposure of photographic material, and subsequent chemical developing of the latent image in a processor that develops, fixes, and washes the latent image to form a silver image.

In electronic prepress systems, images to be printed by offset printing means are scanned from photographic negatives and digitized, assembled and edited electronically at a workstation, and then transmitted to a raster image processor or "RIP" for half-tone screening and image rasterization. The "RIP image", that is, the rasterized image to be printed, is then transmitted from the RIP to an imagesetter for photographic or film recording. Such an electronic prepress system is described in U.S. Pat. No. 4,004,079 and is available from Miles, Inc. under the Trademark "COLOR-SCAPE".

An imagesetter includes a supply of unexposed photosensitive material, a recording support surface, and an image exposing system for forming the image to be recorded according to the RIP image data. The image exposing system may employ a laser beam, a cathode ray tube (CRT), an LED emitter or the like as a radiation source. The material passes from a supply roll as a web to the recording support surface at which point the photosensitive material is exposed to the recording radiation, forming a latent image. Numerous images may be recorded onto the web consecutively. The exposed material advances onto a take-up cassette that takes up the entire length of recording material and maintains it in light-tight environment. The take-up cassette is then removed and transported from the imagesetter to the film processor where chemical processing occurs. The transport system of the processor usually transports the material at a constant speed during developing and fixing.

The system requires the web to be wound onto the take-up cassette at the speed of the imagesetter, the take-up cassette to be physically removed and transported to the processor, and the media to be removed from the take-up cassette at the speed of the processor. Additionally, after the developing occurs in the processor, the entire length of recording material must be cut into sheets to separate the images. This requires two manual steps that slow operation.

Consequently, a single phase buffer was developed that provides a bridge from the imagesetter directly to the processor, similiar to UK Patent Application GB 2,100,882. Here, an image is recorded onto the web material, advanced to a cutter within the imagesetter, cut, and fed into the bridge. The light-tight single phase buffer receives a latent image on a cut sheet of the web material at the imagesetter speed, and then the processor takes the sheet from the bridge at the processor operating speed. This overcomes the problem of transporting the take up cassette and cutting the images manually. However, the single phase buffer is limited to transferring only one sheet at a time. Additionally, the imagesetter remains idle while the entire first sheet is processed since the bridge must be completely cleared due to the imagesetter typically running faster than the processor. Although this method provides automation, it still slows the overall operation.

Another disadvantage of the single phase buffer is that the length of the film that can be taken into the buffer is limited to the approximate length of the bridge. Therefore, after the imaging is complete, the film is advanced to the cutter, cut, and then delivered to the buffer. The end of the image is advanced from the imaging point to the cutting point within the imagesetter, during which time no imaging occurs. The film is then cut, leaving a large unexposed area of film at the leading edge of the web from behind the cutter back to the imaging point; a result of the advancement of the film to be cut from the web. Because this cycle of advancing and cutting occurs often, there are frequent unexposed areas of film.

Accordingly it is a general object of the invention to buffer two consecutive sheets of media simultaneously and automatically while minimizing idle time of the imagesetter.

It is an object of the invention to have a buffer integral with an imagesetter. The buffer is designed within an internal drum recorder to transport media from the front of the imagesetter, over the drum, and out the rear of the imagesetter, to reduce the number of components in the photographic imaging and developing system and reduce the required floor space of the overall system.

Another object of the invention is to mount a dual-buffer pivotally within an imagesetter so that the buffer may be pivoted into a non-operational position.

It is a specific object of the invention to provide the user of a system containing an integral dual-buffer, with an option to use a take-up cassette instead of the dual-buffer if so desired.

SUMMARY OF THE INVENTION

According to the present invention, a buffer for transporting sheets of media from a first station to a second station, comprises a media path leading from the first station to the second station, transport system for transporting the sheets along the media path, and over-running clutch system integral with the transport system for allowing the sheets to be fed into the media path at a first end of the buffer from the first station at a speed faster than the sheets are transported by the transport system, and for allowing the sheets to be pulled out of the media path at a second end of the buffer by the second station at a speed faster than the sheets are transported by the transport system.

Further, the present invention comprises a buffer for transporting media within an imagesetter having a drum recording surface supporting the media during an imaging process. The media is supported from a first end of the drum recording surface located near a media supply roll to a second end of the drum recording surface located near an entrance to the buffer. A media path leads from the second end of the drum recording surface, traverses a coincident area occupied by the drum recording surface, and ends at an outlet of the imagesetter located near the first end of the drum. A transport system is provided for transporting the media along the media path.

According to the present invention, a pivotally mounted buffer for transporting media from a first station to a second station comprises a media path leading from the first station to the second station, a system for transporting the media along said media path, and the buffer being pivotally mounted between an operational position in which the buffer accepts media from the first station, and a non-operational position in which the buffer does not accept media to be transported.

BRIEF DESCRIPTION OF THE DRAWINGS

The features and objects of the invention will become apparent in the following description taken with the accompanying drawings, in which:

FIG. 3c is a front view of a pair of drive rollers each having an integral over-running clutch assembly.

DETAILED DESCRIPTION OF THE INVENTION

Figure 1:
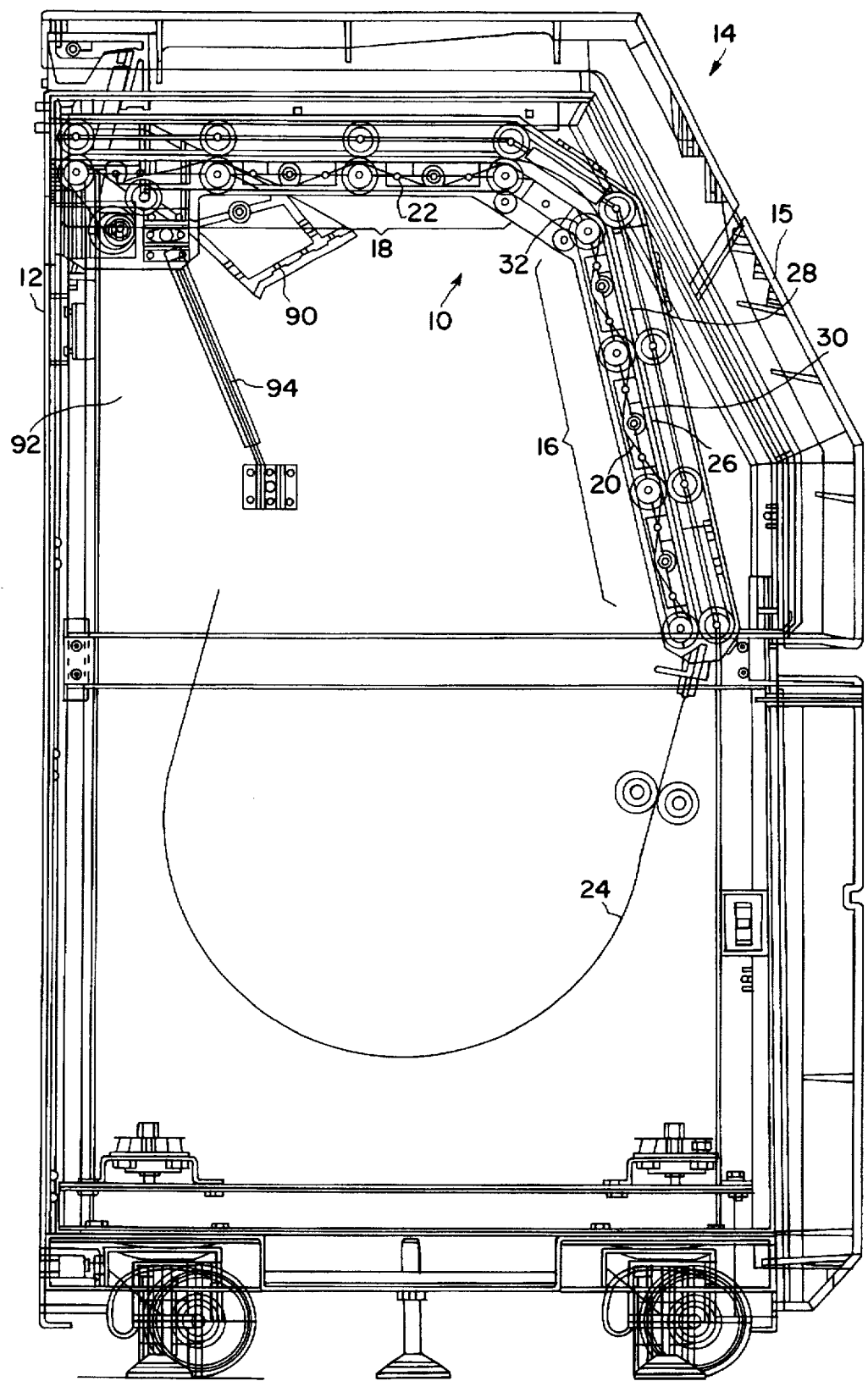
FIG. 1 is a side view of an internal drum recorder employing a dual buffer according to the invention with a side panel of the internal drum recorder removed to view the dual buffer.
Figure 2:
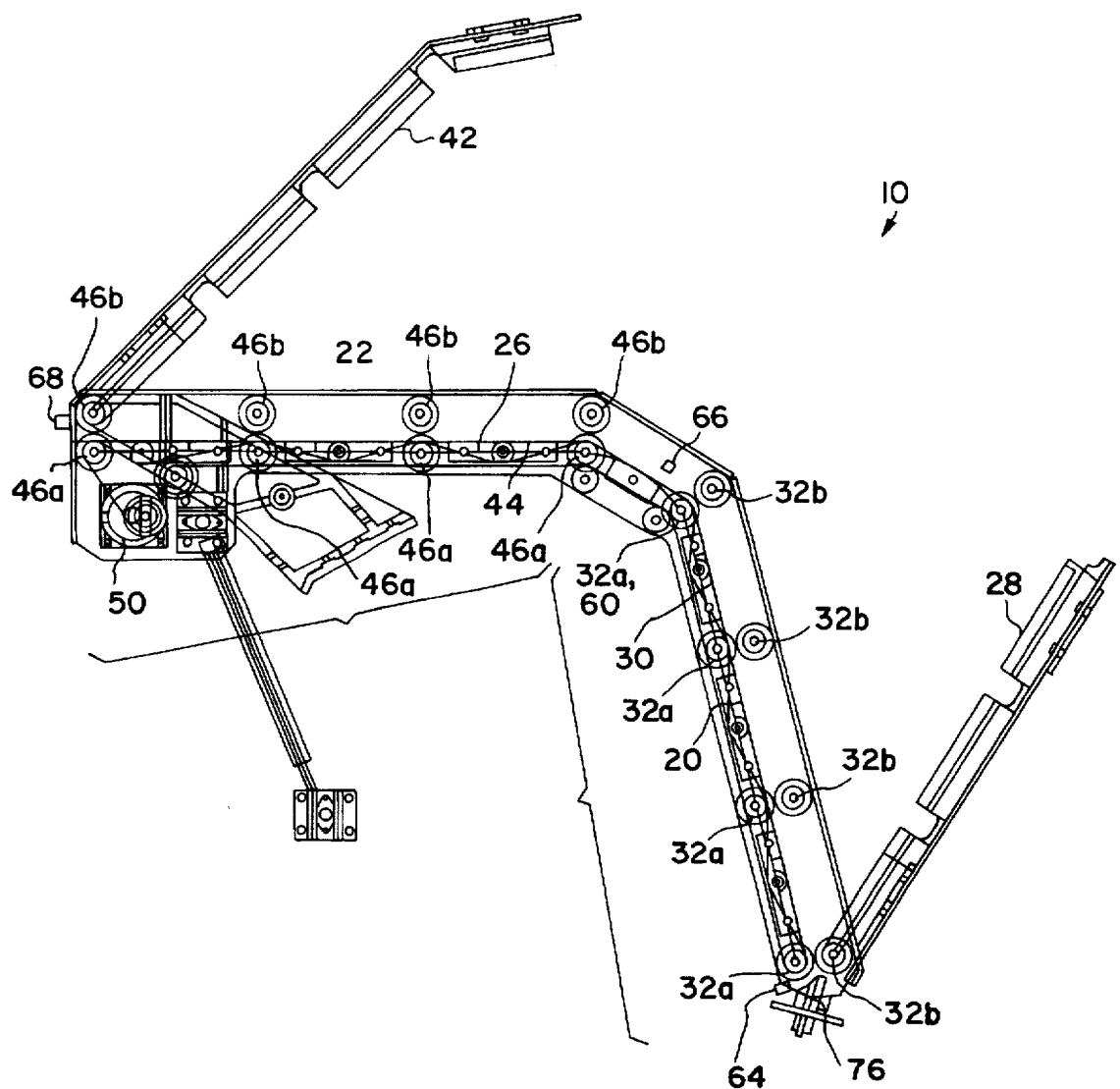
FIG. 2 is an enlarged side view of the dual buffer of FIG. 1.

Referring to FIGS. 1 and 2, a preferred embodiment of an internal dual-buffer, generally referred to by reference numeral 10, is shown mounted inside a frame 12 of an internal drum recorder, generally referred to as reference numeral 14. The buffer 10 is completely enclosed under light-proof covers 15. The dual-buffer 10 has an input stage 16 and an output stage 18 that are driven by independent input and output drive systems 20, 22, respectively. The input stage 16 begins at the edge of the internal drum recording surface 24 and transports media along a media path 26 from the front of the imaging device, over the drum 24 through the output stage 18, and out a rear side of the imaging device to a processing station (not shown). The transport path 26 through the imaging device reduces the floor space that is typically required for buffer systems. The footprint, or floor space required, is the same for the imaging device with the integral dual-buffer as it is for the imaging device alone.

Referring now to FIG. 2, an upper input platen surface 28 and a lower input platen surface 30 are normally parallel to one another and to the media transport path 26 as shown in FIG. 1, to guide incoming media in a substantially linear path, and to keep the media flat during transportation. The platen surfaces 28, 30 are shown in an open position in FIG. 2 for purposes of illustration. Spaced along the upper and lower input platen surfaces 28, 30, respectively, are four pairs of input rollers 32a,b, each pair having a drive roller 32a and an idler roller 32b, both aligned with their outer diameter tangent to the media transport path 26. The input set of drive rollers 32a are connected together by the input drive system 20 which in this embodiment is shown as a pulley and belt drive, but may be any type of drive that drives the four drive rollers 32a in unison at substantially equal speeds. An input drive motor (mounted on hidden side of buffer 10 in FIG. 2) is attached to the input drive system 20 in a convention manner.

The output stage 18 picks up the media from the input stage 16 to deliver the media out from the internal drum recorder 14 to the processor. The output stage 18 and the input stage 16 have substantially identical elements, including an upper output platen surface 42 and a lower output platen surface 44, four pairs of output rollers 46a,b, each having a drive roller 46a and idler roller 46b, and the output drive system 22 with an output drive motor 50.

Figure 3A:
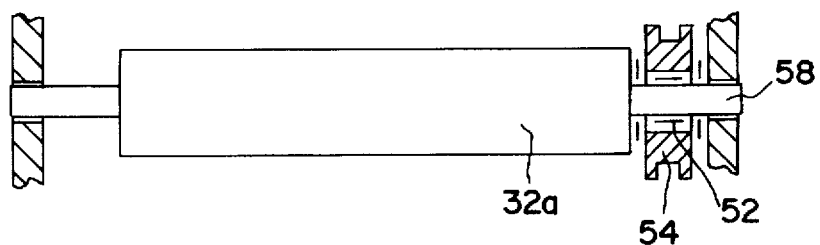
FIG. 3a is a front view of a drive roller having an integral over-running clutch assembly.

The drive rollers 32a, 46a in the input and output stages 16, 18, respectively, are equipped with integral over-running clutches 52, shown in FIG. 3a on drive roller 32a. In the preferred embodiment, each drive roller 32a, 46a has a drive pulley 54 mounted onto one of its end shafts 58 by means of an over-running clutch 52. The over-running clutch 52 only allows one way relative rotation between the end shaft 58 and the drive roller which rotate together, and the pulley 54. The over-running clutch 52 also allows the drive roller 32a to rotate faster than or over-run the driving speed of the pulley 54, such that a sheet of media may be pulled out of the output stage 18 (FIG. 2) by the processor (not shown) at a speed that is faster than the transporting speed of the output stage 18.

Figure 3B:
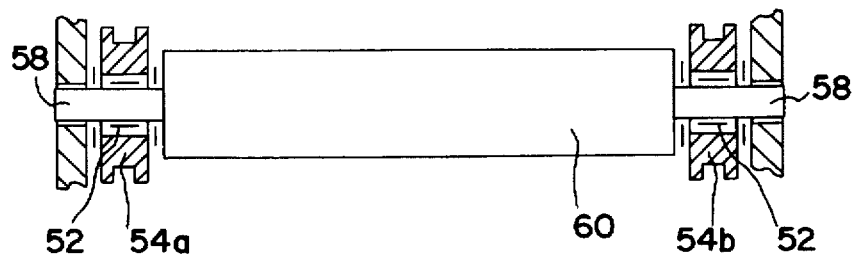
FIG. 3b is a front view of a common drive roller having two integral over-running clutches assemblies.

Referring to FIG. 2, the last pair of rollers 32a,b in the input stage 16 prior to the output stage 18 is common to both the input and the output drive systems 20, 22 to ease the transfer of media from the input stage 16 to the output stage 18. It can be seen in FIG. 3b that the common drive roller 60 has a drive pulley mounted on each of its two end shafts 58. An input pulley 54a is driven by the input drive system 20 and an output pulley 54b is driven by the output drive system 22. However, rotation of the input pulley 54a and thus the common drive roller 60 does not cause rotation of the output pulley 54b or any part of the output drive system 22 and vise-versa, due to both the input and the output pulleys 54a,b both being mounted with integral over-running clutches 52. Although the common pair of rollers 60 may be operated by the both drive systems 20, 22, the input and output drive systems are effectively independent of one another.

Referring to FIG. 2, an input sensor 64 is located at the entrance to the input stage 16, an intermediate sensor 66 is located between the input and output stages 16, 18, and an output sensor 68 is located at the exit of the output stage 18. The sensors 64, 66, 68 are used to indicate whether media is present in the input and output stages 16, 18.

The operation of the dual-buffer 10 will be described with reference to FIGS. 4a–e, which have most reference numerals omitted for clarity. Attention should be directed to FIGS. 1 and 2 which display the element numbers for the following description of the invention.

Figure 4A:
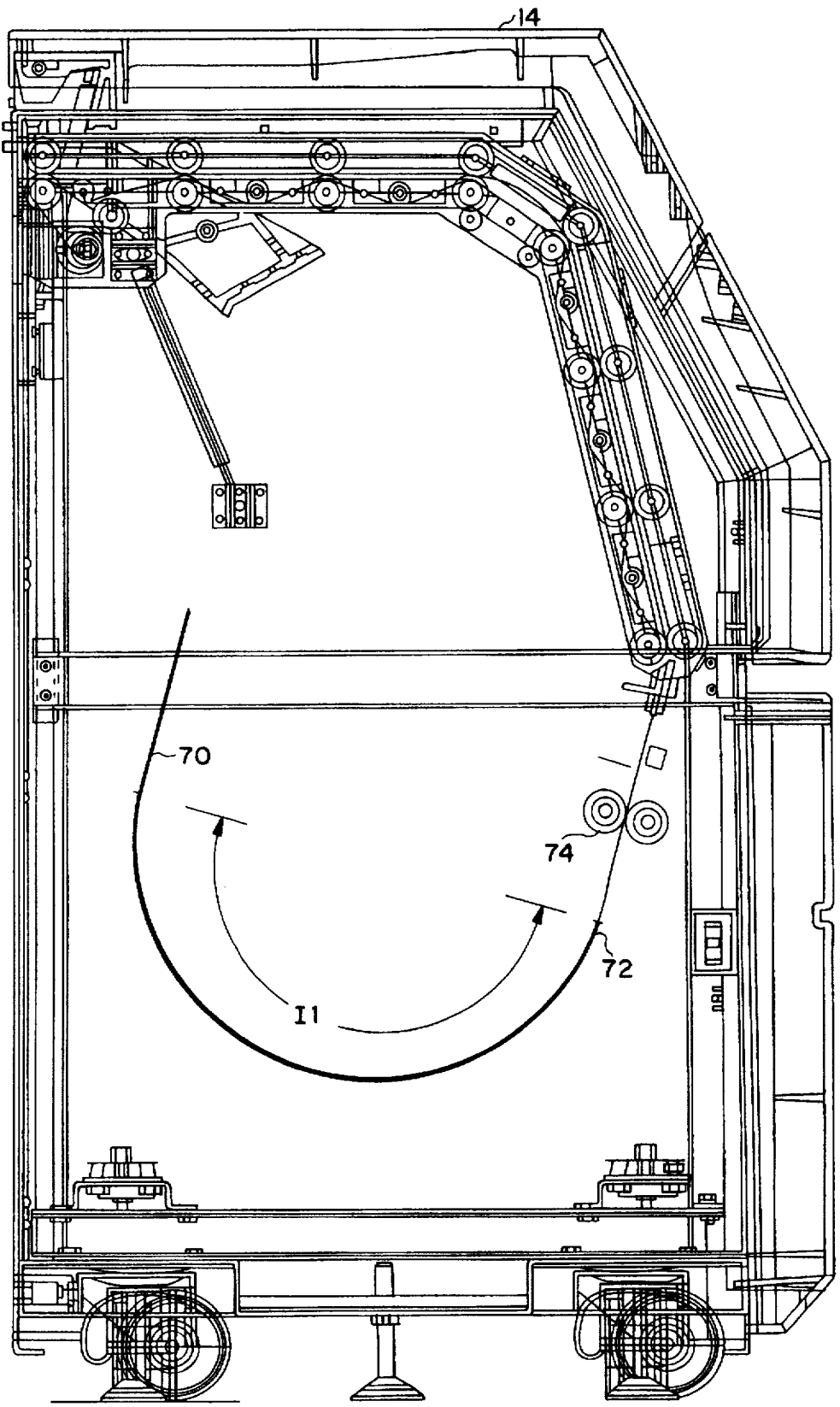
FIGS. 4a–e are sequential views of the stages of operation of the internal dual buffer of FIG. 1 operating within the internal drum recorder.

A first image I1 is recorded onto the media 70 in the internal drum 24 of the image recorder 14, as illustrated in FIG. 4a. The media 70 is stationary during image recording and a leading edge 72 of the media 70 is held at roller nip 74. At the completion of the first image I1, the input sensor 64 and the intermediate sensor 66 are checked to see if the input stage 16 is clear.

The media is advanced from the internal drum by rollers 74 through a mouthpiece 76 into the nip of the first pair of rollers 32a,b of the input stage 16. The input drive motor (not shown) drives the drive rollers 32a at a speed equal to or slightly slower than the rollers 74 advancing the media from the drum. When the leading edge of the first image I1 passes the input sensor 64, a message is relayed to the operator indicating the input stage 16 is accepting media. The media is advanced to the intermediate sensor 66 or until the end of the first image I1 reaches the roller nip 74, when the input drive motor (not shown) is shut off to stop the media advancement, as illustrated in FIG. 4b.

Figure 4B:
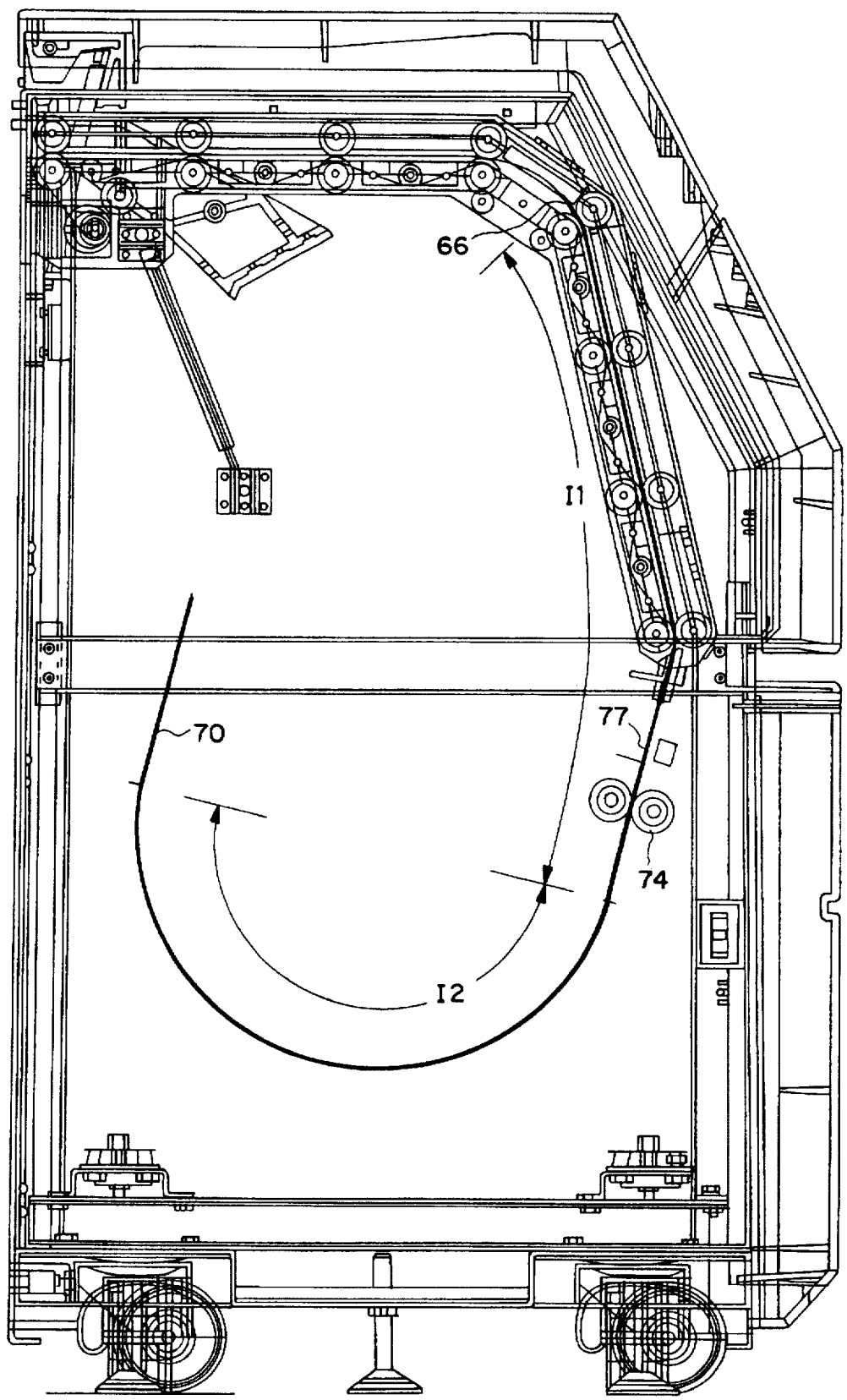
Figure 4C:
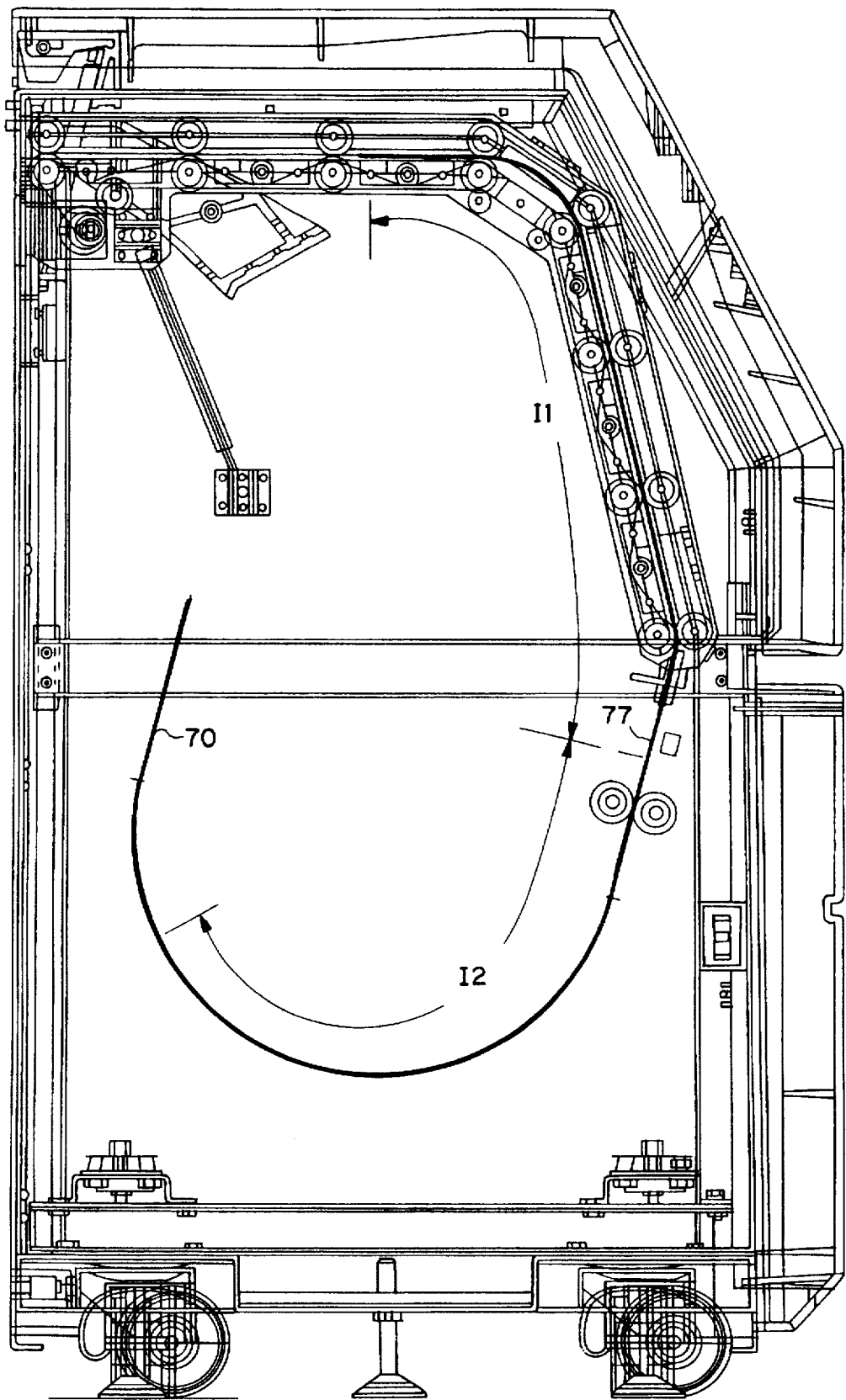

The second image I2 is then recorded onto the media 70 as shown in FIG. 4b in the internal drum 24 of the image recorder 14 while the media 70 is held stationary in the drum 24 and the previous first image I1 waits in the input stage 16 of the dual-buffer 10. Next, the intermediate sensor 66 and the output sensor 68 are checked to see if the output stage 18 is clear. If the output stage 18 is clear, the media is advanced by the rollers 74 and the input drive 20 so that the end of the first image I1 is just past the cutter 77. This position is shown in FIG. 4c. The first image I1 is cut from the second image I2, and the input and output drive systems 20, 22 are turned on to flush the first image I1 out of the input stage 16 and into the output stage 18. The input sensor 64 and the intermediate sensor 66 indicate when the input stage 16 is clear and the input drive system is turned off.

Figure 4D:
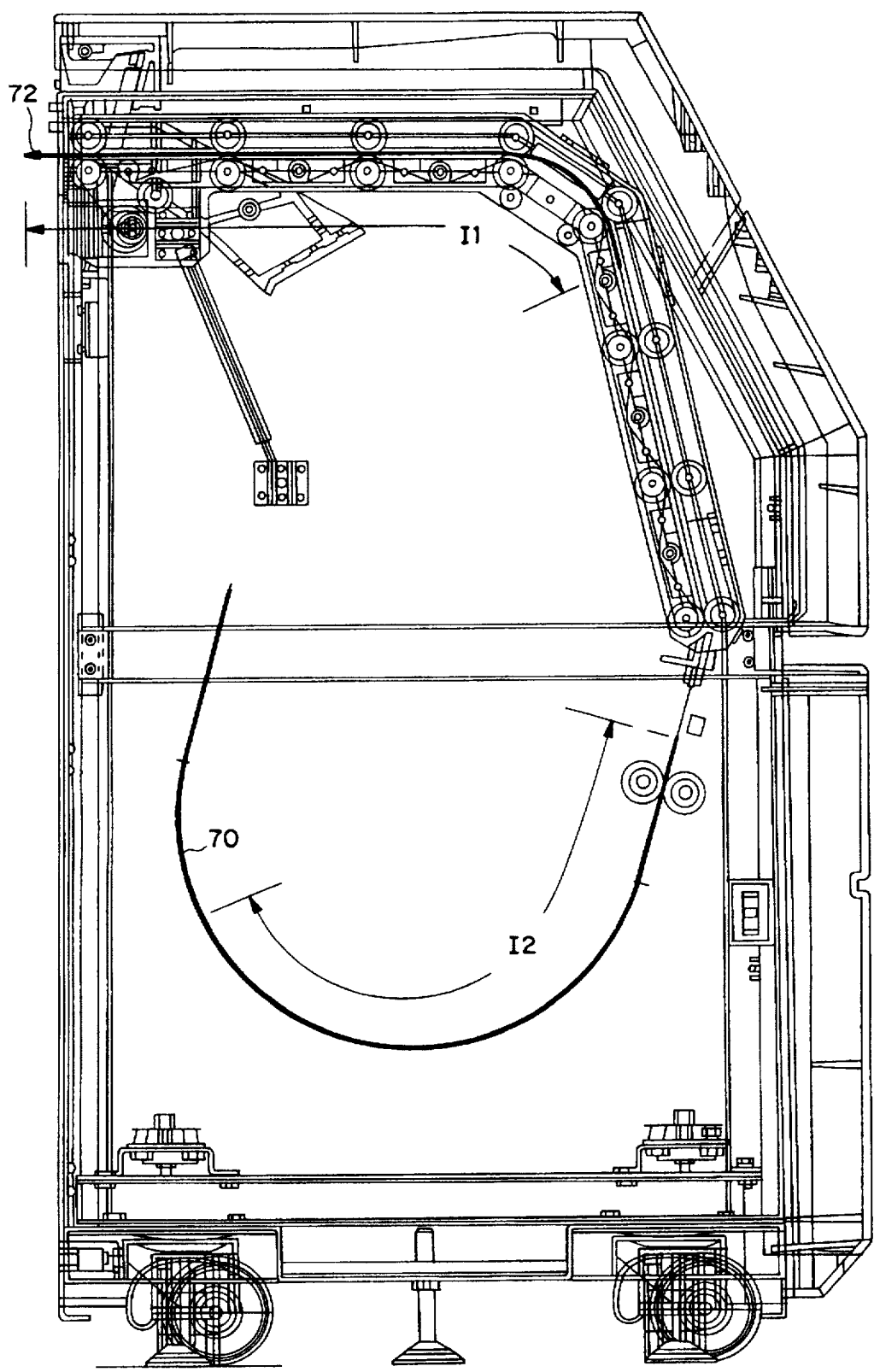
Figure 4E:
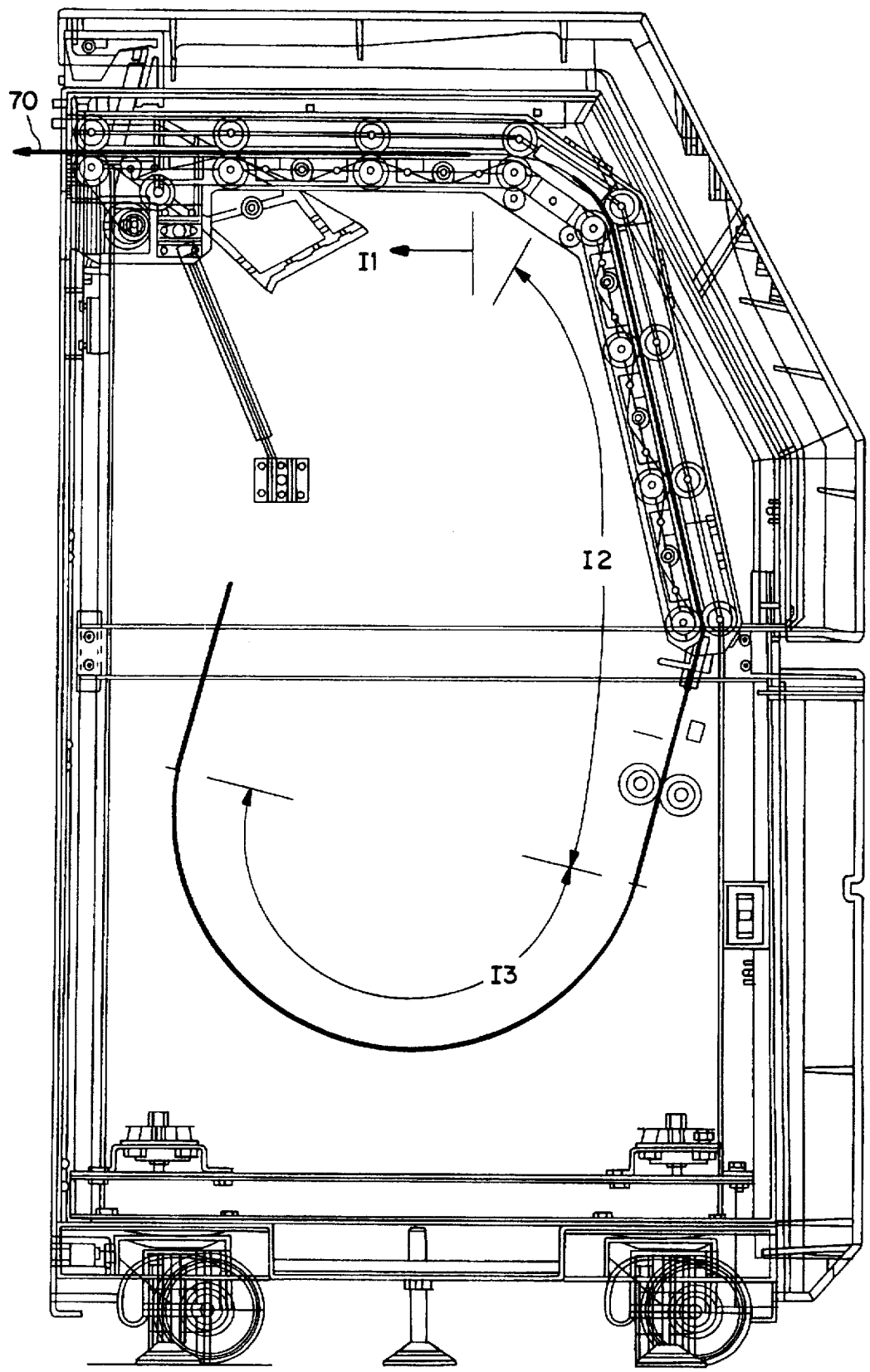

At this point in the operation of the dual-buffer 10, both the input stage 16 and the output stage 18 are operating simultaneously. For simplicity, first the transportation of the first image I1 from the output stage 18 to the processor will be described. The output sensor 68 senses the leading edge of the first image I1 and indicates to the operator that the output stage 18 is full. The output drive system 22 continues operating at a speed slightly faster than the speed of the input stage 16. Referring to FIG. 4d, it can be seen that the leading edge 72 of the first image I1 exits the housing 12 of the recording device 14 and enters the processor (not shown), at which point the processor transport system takes over and a signal is relayed from the processor to turn off the output drive system 22. The first image I1 is then pulled out of the output stage 18 of the buffer 10 at the required speed by the processing device, as illustrated in FIG. 4e. The over-running clutches mounted on the roller shafts facilitate the exiting of the media from the buffer.

In the meantime, the input sensor 64 and the intermediate sensor 66 are checked to see if the input stage 16 is clear to advance the second image I2 (FIG. 4d). The media 70 is advanced from the internal drum 24 through the mouthpiece 76 into the nip of the first pair of rollers 32 of the input stage 16. The input drive motor (hidden) drives the drive rollers 32 of the input drive system 20 at a speed equal to that of the rollers 74 advancing the media 70 from the drum 24. When the leading edge of the second image I2 passes the input sensor 64, a message is relayed to the operator indicating an "OK" status, and that the input stage 16 is accepting media (FIG. 4e). The media 70 is advanced to the intermediate sensor 66 or until the end of the second image I2 reaches the roller nip 74, and the input drive motor (not shown) is shut off to stop the media.

A third image I3 is then recorded onto the media 70 in the internal drum 24 of the image recorder 14 while the media 70 is held stationary and the second image I2 waits in the input stage 16 of the dual-buffer 10, as illustrated in FIG. 4e. The operation now is in a cycle and when the output sensor 68 indicates that the first image I1 has cleared the output stage 18, the process may be repeated in the manner described above.

Figure 5:
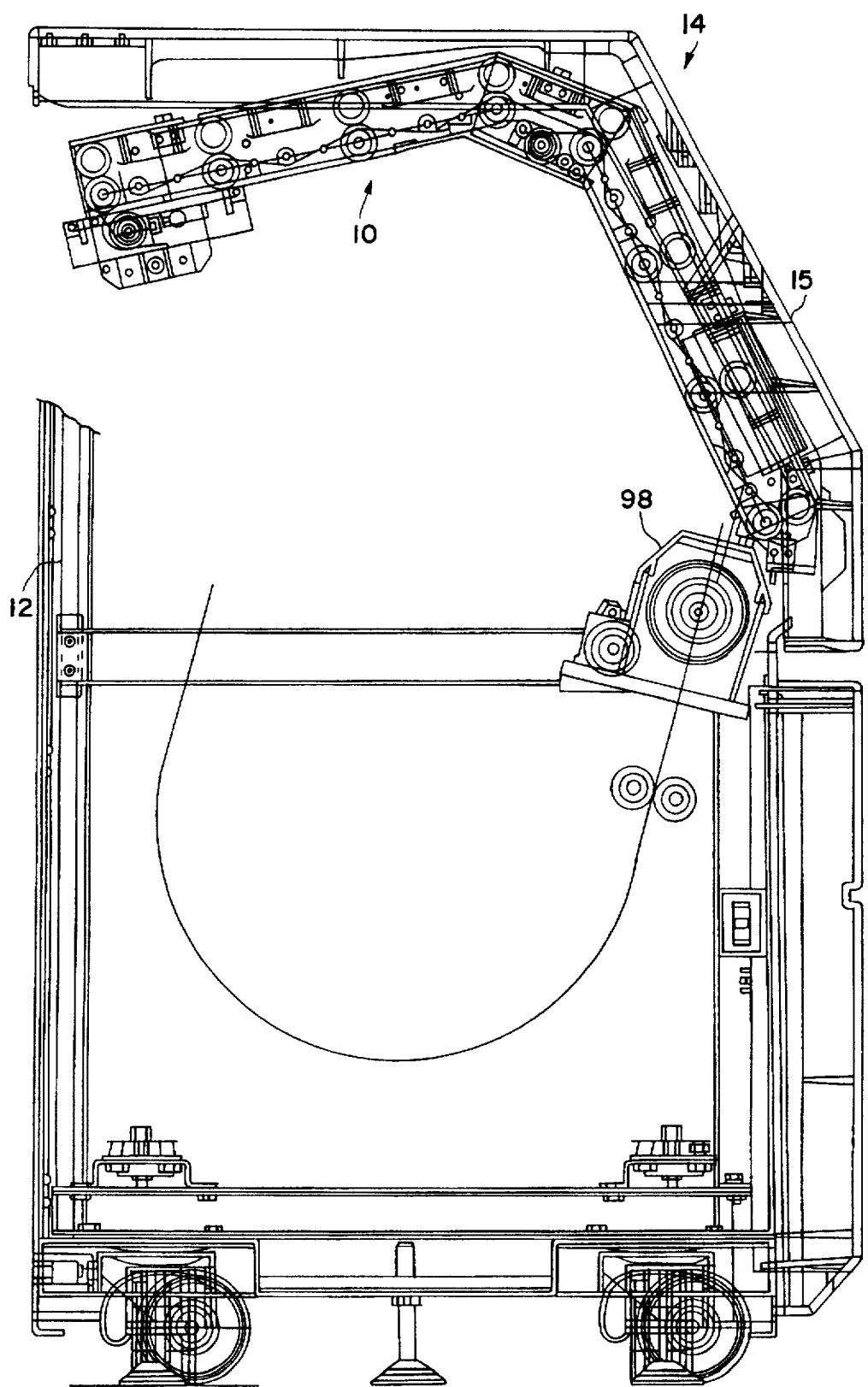
FIG. 5 is a side view of the dual buffer of FIG. 1 in a non-operational position.

As shown in FIG. 1, the buffer 10 is installed within the imaging device 14 and is pivotable at the output end about two support arms 90 which are bolted to side plates 92 (one shown) of the device. Support for the weight of the buffer 10 is provided by gas shocks 94 (one shown) secured at the buffer side plates 92 and upper structure. The shocks 94 aid the user in lifting the buffer 10 out of the operational position and into the non-operational position shown in FIG. 5, for access to the rear of the imaging device 14. The pivotability of the entire buffer 10 also allows a take-up cassette 98 to be inserted into the take-up area, providing an alternative use to the buffer 10. This is achieved by lifting and pivoting the buffer 10, inserting the take-up cassette 98 into a bracket (not shown) provided in the frame 12, and lowering the buffer 10 onto the take-up cassette 98 in a neutral, non-operational position. The covers 15 of the imaging device 14 are then closed to light-proof the interior of the imaging device 14. It can be seen by comparing FIGS. 1 and 5 that the covers 15 are in the same position whether the device 14 is using the buffer 10 or the take-up cassette 98, making the imaging device aesthetically pleasing to the operator.

The embodiment described above integrates the dual-buffer into an imaging device. It is possible, however, for the dual-buffer to be enclosed and integral with the processor described above, or for the buffer to be self-contained in a stand alone unit.

In an alternative embodiment, the buffer acts as an internal single-buffer. The apparatus for a single-buffer is less complicated than the dual-buffer. The input and output sections of the buffer are combined to form one stage that is driven by one drive system connecting all the drive rollers through a pulley and belt drive. In this embodiment all of the drive rollers are equipped with over-running clutches for accommodating speed differentials between neighboring pairs of rollers. For cost savings in less sensitive systems, only the drive motor may require an over-running clutch provided the drive rollers run on similar speeds. The advantage of the internal single-buffer is that it transports media from the imaging section to the processor while being internal to the imaging device and therefor requires no additional floor space. However, the single-buffer is not as efficient as the dual-buffer, as it is limited to transporting one sheet of media at a time due to a singular drive system. This introduces a time delay when an image is waiting in the single-buffer for the processor to clear and accept the image from the buffer.

In another embodiment, spaced along the upper and lower platen surfaces of the buffer are pairs of rollers, where each pair has two drive rollers instead of a single drive roller paired with an idler roller. The drive rollers along the upper platen are driven by an upper drive system which may be a pulley and belt drive. Likewise the drive rollers along the lower platen are driven by a lower drive system. Every drive roller is provided with an over-running clutch 52 (FIG. 3c) at its drive connection, for example, at the mounting of each drive pulley 54 on the end shaft 58 of each drive roller. In this case, the over-running clutches 52 serve to equalize speed differentials between adjacent pairs of drive rollers along the media transport path. The speed differentials occur when the diameters of the paired drive rollers or of adjacent drive rollers are slightly different, due to the media being nipped between the drive rollers as it is transported.

Figure 6:
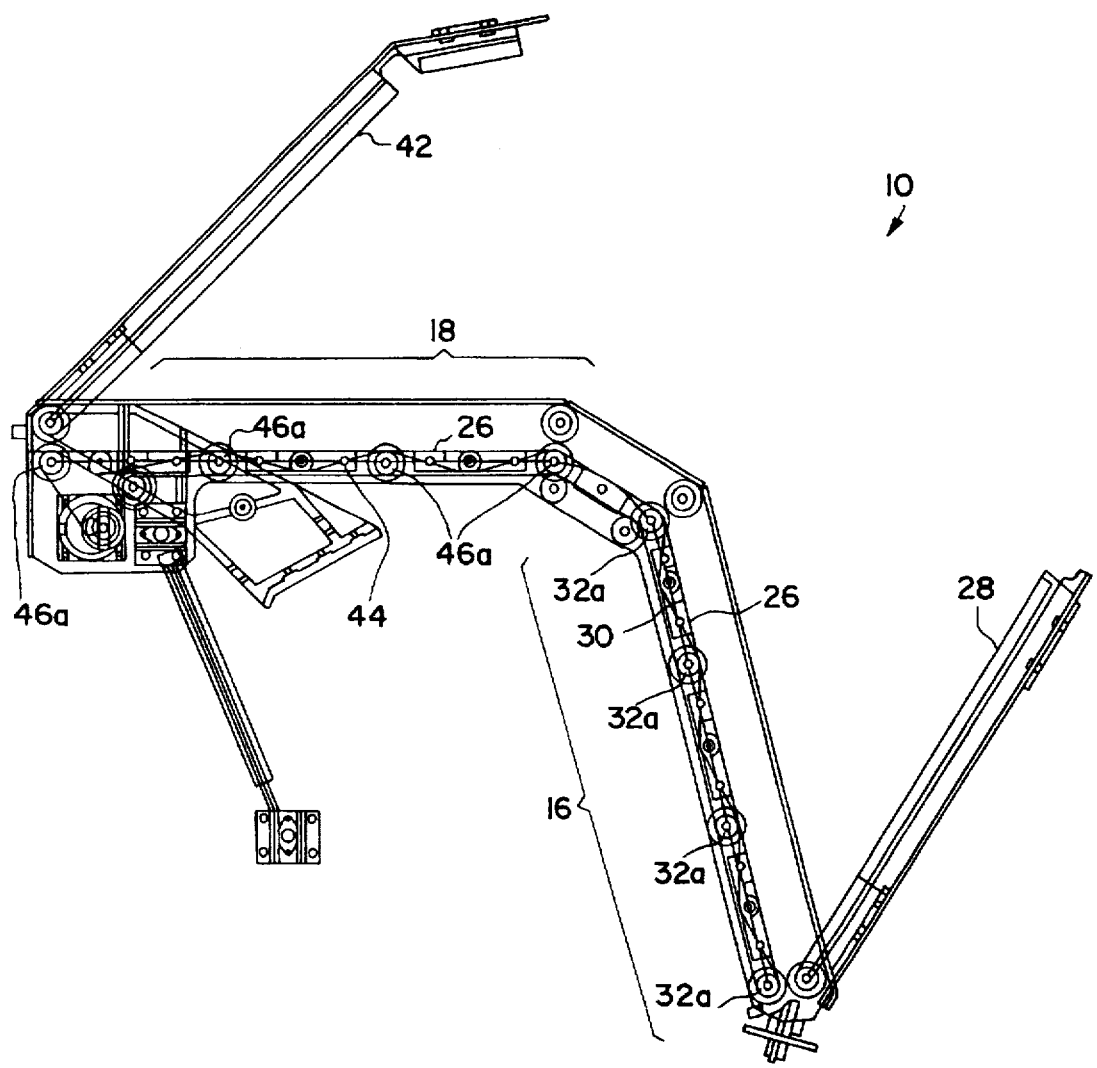
FIG. 6 is an enlarged side view of an alternative embodiment of the dual buffer.

In another embodiment, the buffer 10 has unpaired drive rollers, as viewed in FIG. 6. The upper platens 28, 42 are opposite from the unpaired drive rollers 32a, 46a, respectively, such that the media transport path passes in-between the unpaired rollers and the platen. The drive rollers 32a, 46a may be all on the lower surface, as shown, or may be alternated between the upper and lower surfaces. In the input stage 16, the unpaired drive rollers 32a have lower input platen 30 adjacent thereto in a direction tangentially along the media transport path 26. The drive roller 46a are adjacent to the lower output platen 44 in the output stage 18. This embodiment is intended mainly for stiff media, such as plate materials, as well as for substantially linear media transport paths or those having a large radius of curvature. The design saves cost expense of rollers and complex drive systems.

It is intended for the single-buffer and dual-buffer to be used in various applications, with media of all types, such as paper or plate materials. The processor described herein includes any post-imaging device, such as a chemical processor or a processor used in dry imaging systems.

While this invention has been described in terms of various preferred embodiments, those skilled in the art will appreciate that various modifications, substitutions, omissions and changes may be made without departing from the spirit thereof. Accordingly, it is intended that the scope of the present invention be limited solely by the scope of the following claims, including equivalents thereof.

What we claim and desire to secure by letters of patent of the United States are the following:

1. A buffer for transporting sheets of media from a first station to a second station, comprising:
    a media path leading from the first station to the second station;
    transport means for transporting the sheets along said media path comprising input drive means for driving the sheets along said media path from the first end of the buffer to a middle portion of the buffer and output drive means for driving the sheets along the media path from the middle portion of the buffer to the second end of the buffer, wherein said input drive means and said output drive means operate independently from one another; and
    over-running clutch means integral with said transport means for allowing the sheets to be fed into said media path at a first end of the buffer from the first station at a speed faster than the sheets are transported by said transport means, and for allowing the sheets to be pulled out of said media path at a second end of the buffer by the second station at a speed faster than the sheets are transported by said transport means.

2. The buffer according to claim 1 wherein the buffer is adapted to transport consecutive sheets of media simultaneously.

3. The buffer according to claim 1 wherein the buffer is pivotally mounted at the second end to be pivotable between an operational position in which the buffer accepts sheets of media from the first station and a non-operational position in which the buffer does not accept sheets of media.

4. The buffer according to claim 3, in combination with take-up cassette means for accepting the media from the first station while the buffer is pivoted into the non-operational position.

5. A buffer for transporting sheets of media from a first station to a second station, comprising:
    a media path leading from the first station to the second station;
    a plurality of input rollers tangentially and rotatably mounted along said media path from the first end of the buffer to a middle portion of the buffer;
    a plurality of output rollers tangentially and rotatably mounted along said media path from the middle portion of the buffer to the second end of the buffer;
    input drive means for driving the input rollers in unison;
    output drive means for driving the output rollers in unison and independently of the input rollers;
    over-running clutch means integral with the input rollers and the output rollers for allowing the input rollers to rotate faster than said input drive means rotates the input rollers, and for allowing the output rollers to rotate faster than said output drive means rotates the output rollers, respectively.

6. The buffer according to claim 5, wherein the input rollers and the output rollers have a common roller that is driven by said input drive means and said output drive means, and wherein said over-running clutch means allows said common roller to be driven by said input drive means without effecting said output drive means, and to be driven by said output drive means without effecting said input drive means.

7. The buffer according to claims 5 or 6, further comprising a plurality of complementary rollers along said media path in alignment with the input and output rollers, forming a plurality of pairs of rollers with said media path between said pairs of rollers.

8. The buffer according to claim 7 wherein the complementary rollers are idler rollers.

9. The buffer according to claim 7 wherein the complementary rollers are driven rollers each having integral over-running clutch means for accommodating speed differentials between adjacent pairs of rollers along said media path.

10. The buffer according to claims 5 or 6, further comprising:
    platen means for guiding and supporting the media as it is transported along said media path, wherein the input and output rollers are unpaired and said platen means is opposite from the input and output rollers and said media path is between the input and output rollers and the platen means, and said platen means is adjacent the input and output rollers in a direction along said media path.

11. The buffer according to claims 5 or 6, further comprising:
    platen means for guiding and supporting the media as it is transported along said media path;
    at least one idler roller along said media path paired with and in rolling contact with one of the input and output rollers; and,
    at least one of said plurality of input and output rollers is unpaired and a portion of said platen means is opposite said at least one and said media path is between said portion of said platen means and said at least one.

12. An imagesetter comprising an internal drum having a interior support surface supporting an image receiving media during imaging of the media by an imaging system and buffer means for transporting the media within the imagesetter from the internal drum to a processing unit, said internal drum having an input end located at a media supply and an output end located at an entrance to said buffer means, and wherein said buffer means has a media path starting at the output end of the internal drum and ending at an outlet of the imagesetter, wherein said buffer means is pivotally mounted in said imagesetter to be pivotable between an operational position in which said buffer means receives media from the internal drum and a non-operational position in which the buffer means does not receive media to be transported.

13. The imagesetter according to claim 12, further comprising take-up cassette means for taking-up the media from the internal drum for temporary storage when said buffer means is pivoted to the non-operational position.

14. An imagesetter comprising an internal drum having a interior support surface supporting an image receiving media during imaging of the media by an imaging system and buffer means for transporting the media within the imagesetter from the internal drum to a processing unit, said internal drum having an input end located at a media supply and an output end located at an entrance to said buffer means, and wherein said buffer means has a media path starting at the output end of the internal drum and extending across the internal drum to the processing unit, and wherein the internal drum and said buffer means occupy a substantially identical area within said imagesetter.

15. A buffer for transporting sheets of media from a first station to a second station, comprising:

(A) a media path leading from the first station to the second station;

(B) a plurality of rollers tangentially and rotatably mounted along said media path;

(C) drive means for driving the rollers in unison;

(D) over-running clutch means integral with each of said rollers for allowing the rollers to rotate faster than said drive means rotates the rollers; and, (E) a plurality of complimentary rollers along said media path in alignment with the rollers having integral over-running clutch means.

16. The buffer according to claim 15 wherein the complementary rollers are idler rollers.

17. The buffer according to claim 15 wherein the complementary rollers are driven rollers each having integral over-running clutch means for accommodating speed differentials between adjacent pairs of rollers along said media path.

18. A buffer for transporting sheets of media from a first station to a second station, comprising:

(A) a media path leading from the first station to the second station;

(B) a plurality of rollers tangentially and rotatably mounted along said media path;

(C) drive means for driving the rollers in unison;

(D) over-running clutch means integral with each of said rollers for allowing the rollers to rotate faster than said drive means rotates the rollers; and, (E) platen means for guiding and supporting the media as it is transported along the media path, wherein the rollers are unpaired and said platen means is opposite the rollers and said media path is between the rollers and said platen means, and said platen means is adjacent to said rollers in a direction along said media path.

19. A buffer for transporting sheets of media from a first station to a second station, comprising:

(A) a media path leading from the first station to the second station;

(B) a plurality of rollers tangentially and rotatably mounted along said media path;

(C) drive means for driving the rollers in unison;

(D) over-running clutch means integral with each of said rollers for allowing the rollers to rotate faster than said drive means rotates the rollers;

(E) platen means for guiding and supporting the media as it is transported along said media path;

(F) at least one complementary roller along said media path paired with and in rolling contact with one of the rollers; and, (G) at least one of said plurality of rollers is unpaired and a portion of said platen means is opposite from said at least one unpaired roller and said media path is between said at least one unpaired roller and said portion of said platen means.

20. A pivotally mounted buffer means in combination with a take-up cassette means, said buffer means for transporting media from a first station to a second station comprising a media path leading from the first station to the second station, means for transporting the media along said media path, and means for pivotally mounting said buffer means to be pivotable between an operational position in which said buffer means accepts media from the first station, and a non-operational position in which the buffer does not accept media to be transported, said take-up cassette means is mountable at the first station for collecting the media from the first station when said buffer means is pivoted to the non-operational position.

\* \* \* \* \*